United States Patent Office 3,459,837
Patented Aug. 5, 1969

3,459,837
PROCESS FOR PREPARING ALIPHATIC TERTIARY PHOSPHITES
James L. Dever, Lewiston, and James J. Hodan, Williamsville, N.Y., assignors to Hooker Chemical Corporation, Niagara Falls, N.Y., a corporation of New York
No Drawing. Filed July 27, 1966, Ser. No. 568,134
Int. Cl. C07f 9/08; C07c 53/28
U.S. Cl. 260—972                                    10 Claims

ABSTRACT OF THE DISCLOSURE

Tertiary aliphatic phosphites are made by reaction of a phosphorus trihalide with a carboxylic acid salt and then, an aliphatic alcohol. For example, tributylphosphite is made by reacting anhydrous phosphorus trichloride with anhydrous sodium acetate, followed by normal butanol, in anhydrous tetrahydrofuran, at an elevated temperature.

---

This invention relates to a novel process for preparing aliphatic tertiary phosphites. More particularly, this invention relates to a novel process for preparing tertiary aliphatic phosphites by reacting a phosphorus trihalide with a carboxylic acid salt and an aliphatic alcohol.

Prior art methods for preparing tertiary phosphites have included the reaction of an aliphatic alcohol with a phosphorus trihalide in the presence of a hydrogen halide sequestering agent, such as pyridine, tertiary amine, alkali and alkaline earth carbonates, and the like. Utilization of tertiary amines has proved costly, while the utilization of carbonates, such as sodium carbonate, has been found to produce secondary phosphites rather than the desired tertiary phosphites.

Therefore, an object of this invention is to provide an improved process for preparing tertiary phosphites. Another object is to provide a process which can be carried out easily and economically and which results in high yields of desired phosphite. Other and further objects will become apparent to those skilled in th art from the following detailed description.

In accordance with the practice of this invention, high yields of aliphatic phosphites of the formula $P(OR)_3$, wherein R is selected from the group consisting of alkyl and substituted alkyl of 1 to 24 carbon atoms, preferably from 1 to 18 carbon atoms, substituents being selected from the group consisting of chlorine and bromine, are obtained by reacting under substantially anhydrous conditions a phosphorus trihalide with a carboxylic acid salt of the formula R'COOM, wherein R' is an alkyl radical of 1 to 18 carbon atoms, preferably of 1 to 12 carbon atoms, and M is selected from the group consisting of ammonium, alkali metal and alkaline earth metal, thereafter, reacting an unsubstituted or substituted aliphatic alcohol with the reaction mixture, and recovering the desired tertiary phosphite.

The following equations are given to illustrate the process of this invention, but are not intended to be binding as explanations of the mechanism of this invention.

I. 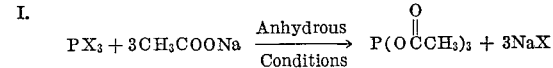

II. 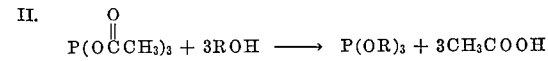

wherein R is as previously described and X is halogen, preferably chlorine or bromine.

As the phosphorus trihalide in the process of this invention there may be employed phosphorus trichloride, or phosphorus tribromide.

Non-limiting examples of the carboxylic acid salts which may be effectively utilized in the process of this invention are ammonium acetate, sodium acetate, potassium acetate, lithium acetate, calcium acetate, barium acetate, magnesium acetate, strontium acetate, ammonium propionate, sodium propionate, potassium propionate, ammonium butyrate, sodium butyrate, calcium butyrate, potassium valerate, calcium valerate, strontium valerate, sodium caproate, calcium caprylate, ammonium undecanoate, sodium laurate, ammonium laurate, potassium laurate, calicum laurate, sodium myristate, calcium myristate and the like.

Typical alcohols utilized in the process of this invention have the formula ROH wherein R is selected from the group consisting of alkyl radicals of 1 to 24 carbon atoms, preferably from 1 to 18 crbon toms. Examples of such alcohols are methyl alcohol, ethyl alcohol, propyl alcohol, isopropyl alcohol, butyl alcohol, pentyl alcohol, heptyl alcohol, n-octyl alcohol, iso-octyl alcohol, nonyl alcohol, decyl alcohol, undecyl alcohol, dodecyl alcohol, stearyl alcohol and the like.

As indicated above, the phosphorus trihalide, carboxylic acid salt, and alcohol are usually reacted in substantially stoichiometric proportions. Thus, it is preferred first to react about one molar proportion of phosphorus trihalide with about 2.5 to 3.5 molar proportions of the carboxylic acid salt, a salt excess of carboxylic acid salt being preferred, and thereafter, to react about 2.5 to 3.5 molar proportions of the aliphatic alcohol with the resulting reaction mixture. A slight excess of aliphatic alcohol may be effectively employed.

The mixture of phosphorus trihalide, aliphatic alcohol and carboxylic acid salt may be prepared in any suitable manner, for example, by means adapted for batch operation. In the preferred embodiment of this invention, the phosphorus trihalide is reacted under substantially anhydrous conditions with the carboxylic acid salt to form an intermediate product which is subsequently reacted in situ, with the aliphatic alcohol to form the desired aliphatic phosphite. Advantageously, the by-product carboxylic acid formed during the reaction can be recovered; converted to the salt by reaction with a base such as ammonium, sodium hydroxide and like; and reutilized in the reaction as by recycling.

The temperature of the reaction mixture may be maintained in the range of from about $-10$ degrees centigrade to about 75 degrees centigrade, preferably in the range of from about 20 degrees centigrade and to about 50 degrees centigrade. Generally, atmospheric pressures are suitably employed. However, it is within the scope of this invention to utilize subatmospheric or superatmospheric pressures. The reaction time is dependent upon a variety of factors such as the concentration and nature of the reactants, temperature, pressure if employed, type of equipment employed and the like. Generally, completion of the reaction is effected in about 1 to 12 hours.

The process of this invention is most conveniently effected in the presence of an unreactive organic solvent. By unreactive is meant that the solvent is unaffected by and stable to the reactants, products and reaction conditions of the present process. Suitable unreactive solvents for the reactive will be readily recognized by those skilled in the art as including but not limited to tetrahydrofuran, dioxane, hexane and the like. As previously indicated, substantially anhydrous conditions are preferably maintained during the reaction. Thus, the ractants and solvents utilized in this novel process are substantially anhydrous.

Particular advantages of the process of this invention are that the separation and purification steps used to isolate the desired products are simple and are efficiently conducted, and that carboxylic acid obtained can be regenerated and reused. Additionally, the process provides an economical and efficient route for producing aliphatic tertiary phosphites. The separation of the aliphatic phosphite produced by the process of this invention may be accomplished by a variety of means, including, but not limited to steam distillation, distillation at normal or subnormal pressures, extractions, sublimative extraction, centrifugation, decanting and the like.

The following examples illustrate the process of this invention; however, they are not be construed as limiting the invention except as defined in the appended claims. All temperatures are in degrees centigrade and all parts are by weight, unless otherwise mentioned.

Example 1.—Preparation of tributyl phosphite

A reaction vessel was charged with 135 parts of anhydrous sodium acetate in 766 parts of anhydrous tetrahydrofuran. To this mixture were added 69 parts of anhydrous phosphorus trichloride, dropwise over a period of one-half hour, while the temperature was maintained at about 40 degrees centigrade. The mixture was stirred at room temperature over a one hour period. Thereafter, 111 parts of normal butanol were added dropwise over a half hour period, while the temperature was maintained at about 38 degrees centigrade. This mixture was stirred for an additional half hour and filtered. The resulting filtrate was stripped of solvent and was further concentrated by heating to 70 degrees centigrade at an absolute pressure of five millimeters of mercury.

Distillation of the residue yielded 92 parts (74 percent conversion) of clear, colorless tributyl phosphite, having a boiling point of 51–53 degrees centigrade at 0.25 millimeter of mercury absolute pressure. The index of refraction was $n_D^{25}$ 1.4300. The corresponding accepted values for tributyl phosphite are; boiling point 122 degrees centigrade at 12 millimeters of mercury absolute pressure and index of refraction of $n_D^{25}$ 1.4299.

Example 2.—Preparation of trioctyl phosphite

A reaction vessel was charged with 231 parts of hexane and 135 parts of sodium acetate. Thereafter, 69 parts of phosphorus trichloride were added dropwise to the mixture over 20.5 hour period while the temperature was maintained at about 30–35 degrees centigrade by occasional cooling. After stirring the mixture for 1.5 hours, 195 parts of n-octyl alcohol were added over 0.75 hour, while the temperature was maintained at 30–35 degrees centigrade. After stirring the mixture for another 1.5 hours, it was filtered. Solvent and by-product (carboxylic acid) were removed from the filtrate at reduced pressure. Distillation of the residue produced 117 parts (56 percent conversion) of tri (n-octyl) phosphite having a boiling point of 162–166 degrees centigrade and index of refraction of $n_D^{25}$ 1.4448.

Upon replacement of sodium acetate in Example 1 or 2 with an equimolar proportion of ammonium acetate, potassium acetate, lithium acetate, calcium acetate, barium acetate, magnesium acetate, strontium acetate, sodium propionate, sodium butyrate, potassium valerate, sodium caproate, sodium laurate, calcium myristate, or the like, similar results are obtained.

When n-butanol of Example 1 or n-octyl alcohol of Example 2 is replaced with an equimolar proportion of a compound such as methyl alcohol, ethyl alcohol, propyl alcohol, pentyl alcohol, nonyl alcohol, decyl alcohol, lauryl alcohol, stearyl alcohol and the like, the corresponding aiphatic tertiary phosphite.

In like manner, anyone of the mentioned carboxylic acid salts may be utilized in combination with anyone of the mentioned alcohols to product aliphatic tertiary phosphites corresponding to those of Examples 1 and 2.

What is claimed is:

1. A process for preparing tertiary alkyl phosphites of the formula $$P(OR)_3$$

wherein R is selected from the group consisting of alkyl of 1 to 24 carbon atoms, chloroalkyl of 1 to 24 carbon atoms and bromoalkyl of 1 to 24 carbon atoms, which comprises reacting under substantially anhydrous conditions, a phosphorus trihalide selected from the group consisting of phosphorus trichloride and phosphorus tribromide, with a salt of a carboxylic acid, having the formula $$R'COOM$$

where R' is an alkyl radical of 1 to 18 carbon atoms and M is selected from the group consisting of ammonium, alkali metal and alkaline earth metal, and thereafter, reacting with an alkanol of 1 to 24 carbon atoms, at a temperature within the range of about −10 degrees centigrade to about 75 degrees centigrade.

2. A process according to claim 1 wherein the molar amounts of reactants employed are about 1 part of phosphorus trihalide, about 2.5 to 3.5 parts of salt of carboxylic acid and about 2.5 to 3.5 parts of alkanol and the desired tertiary phosphite is recovered from the reaction mixture.

3. A process according to claim 2 wherein the proportions of reactants employed are substantially stoichiometric, the reaction temperature is from about 20 degrees centigrade to about 50 degrees centigrade, the tertiary phosphite made is a trialkyl phosphite wherein the alkyl groups are of 1 to 18 carbon atoms, the salt of a carboxylic acid is of 1 to 12 carbon atoms and the alkanol is of 1 to 18 carbon atoms.

4. A process according to claim 3, wherein the phosphorus trihalide is phosphorus tribromide.

5. A process according to claim 3 wherein the phosphorus trihalide is phosphorus trichloride.

6. A process according to claim 5, wherein R' is alkyl of 1 to 6 carbon atoms.

7. A process according to claim 1, wherein a solvent for the reactants is employed.

8. A process according to claim 6, wherein M is alkali metal.

9. A process according to claim 8, wherein RCOOM is sodium acetate.

10. A process according to claim 6, wherein RCOOM is ammonium acetate.

References Cited

UNITED STATES PATENTS 2,659,747   11/1953   Young _____ 260—988 X

JOSEPH P. BRUST, Primary Examiner

R. L. RAYMOND, Assistant Examiner

U.S. Cl. X.R.

260—413, 540, 541, 545, 971